UNITED STATES PATENT OFFICE.

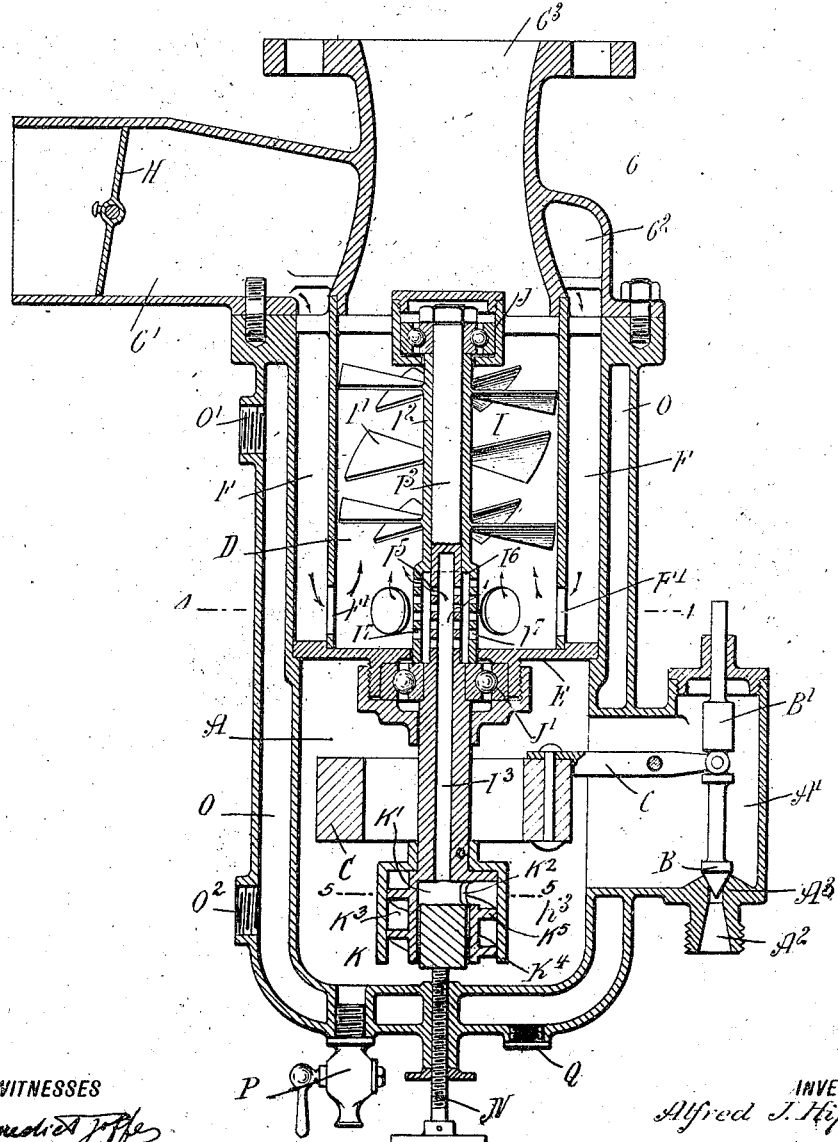

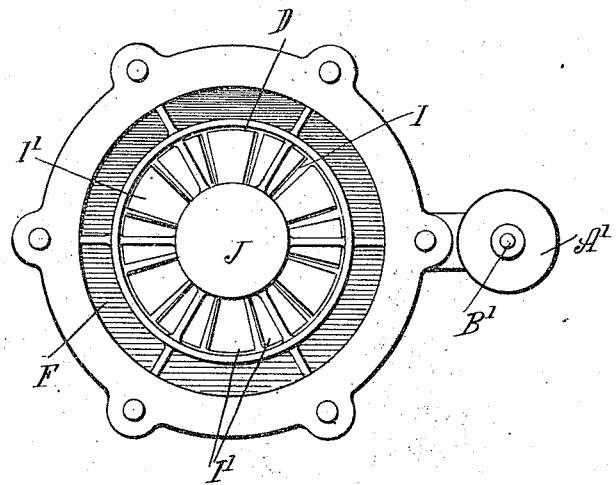
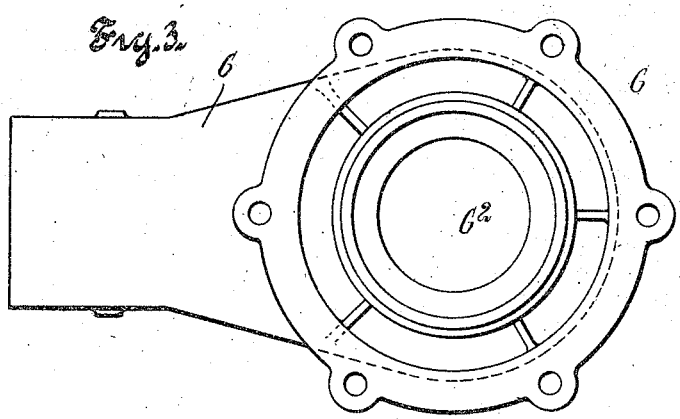
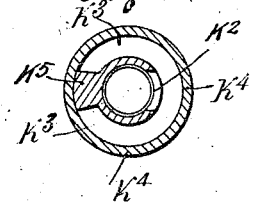
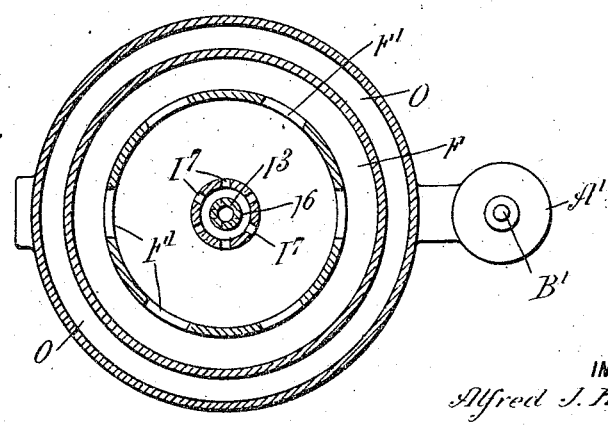

ALFRED J. HIPPEL, OF NEW YORK, N. Y.

CARBURETER.

1,153,077.	Specification of Letters Patent.	Patented Sept. 7, 1915.

Application filed February 6, 1912. Serial No. 675,703.

*To all whom it may concern:*

Be it known that I, ALFRED J. HIPPEL, a citizen of the United States, and a resident of the city of New York, borough of Brooklyn, in the county of Kings and State of New York, have invented a new and Improved Carbureter, of which the following is a full, clear, and exact description.

The object of the invention is to provide a new and improved carbureter arranged to insure a thorough and intimate mixture of the gas and air and to allow convenient adjustment for admitting the gas and air in the proper proportions, to insure the formation of a mixture of a high explosive power. For the purpose mentioned use is made of a mixing chamber containing a revoluble mixing wheel and connected with an air chamber, and a pump driven by the said mixing wheel and having its intake head extending into a reservoir containing oil or other liquid, the said pump discharging into the mixing chamber opposite the air inlet.

A practical embodiment of the invention is represented in the accompanying drawings forming a part of this specification, in which similar characters of reference indicate corresponding parts in all the views.

Figure 1 is a sectional side elevation of the carbureter; Fig. 2 is a plan view of the same with the head removed; Fig. 3 is an inverted plan view of the head; Fig. 4 is a sectional plan view of the carbureter on the line 4—4 of Fig. 1; and Fig. 5 is a sectional plan view of the head of the pump, the section being on the line 5—5 of Fig. 1.

A reservoir A for containing oil or other liquid is provided at one side with an inlet chamber A' having an inlet $A^2$ connected with a source of liquid supply, and the said inlet $A^2$ is provided with a valve seat $A^3$ controlled by a valve B actuated by a float C arranged within the reservoir A, the float having a float lever C' engaging the stem B' of the valve B, as shown in Fig. 1. By the arrangement described the float C rises and falls with the liquid in the reservoir A to close and open the valve B correspondingly for the purpose of maintaining the liquid at a desired level in the reservoir A. On top of the reservoir A is arranged a mixing chamber D separated from the reservoir A by a head or a plate E, and the mixing chamber D is surrounded by an air chamber F closed at its lower end by the plate E. The upper open ends of the mixing chamber D and the air chamber F are provided with a head G having an air inlet tube G' leading to an annular chamber $G^2$ connected with the upper open end of the air chamber F. In the air inlet tube G' is arranged a valve or damper H, under the control of the operator, for regulating the amount of air passing through the tube G' into the air chamber F. The head G is provided with an outlet $G^3$ connected with the upper open end of the mixing chamber D, and the said head G is adapted to be fastened to the engine so that the outlet $G^3$ connects with the cylinder to produce a suction action in the mixing chamber D.

Within the mixing chamber D is arranged a revoluble wheel I having blades I' attached to a sleeve $I^2$ secured to a shaft $I^3$ mounted to rotate in suitable ball bearings J and J', of which the ball bearing J is supported in the upper open end of the mixing chamber D while the bearing J' is attached to the under side of the plate E. The lower portion $I^4$ of the shaft $I^3$ is hollow and extends into a reservoir A, and on the lower terminal of the hollow portion $I^4$ of the shaft $I^3$ is carried an intake head K having means whereby to force a desired quantity of the fluid upwardly within the hollow shaft when the latter is rotated. To this end the said intake head K is provided with a central chamber K' communicating with the hollow of the shaft, and the wall of which central chamber is provided with an opening $K^2$ leading into a chamber $K^3$ surrounding the wall of the central chamber. This chamber $K^3$ is formed between the inner wall and the outer wall $K^4$ and contains a helical flange $K^5$ formed on the inner wall and constituting a fluid lifting screw for forcing fluid into the inner chamber through opening $K^2$ and then upwardly within the hollow shaft when the latter is rotated.

The upper end of the hollow portion $I^4$ of the shaft $I^3$ is provided with perforations $I^5$ leading into an annular chamber $I^6$ formed by enlarging the lower end of the sleeve $I^2$, as will be readily understood by reference to Fig. 1. The chamber $I^6$ is provided in its outer wall with perforations $I^7$ staggered relatively to the perforations $I^5$, so that the liquid in passing through the perforations $I^5$ strikes a solid portion of the outer wall of the chamber $I^6$ to divide or break up the liquid, which is subsequently drawn out into spray through the coöperation of the mixing wheels, and in the sprayed condition passes into the lower end of the mixing chamber D. The air chamber F is connected at its lower end by openings F' with the mixing chamber D so that the openings F' are directly opposite the perforations I⁷ and I⁵, that is, the air and atomized liquid pass into the chamber D at the lower end thereof, namely, below the blades I' of the revoluble wheel I. When the engine is running and a suction is produced in the mixing chamber D the wheel I is caused to rotate and in doing so a rotary motion is given to the head K whereby the liquid contained in the reservoir A which is drawn up the hollow portion I⁴ of the shaft I³ in the manner above described, is sprayed at the upper end of the hollow portion and finally passes in a finely divided state into the inner or lower end of the mixing chamber D to mix with the air passing through the openings F' from the air chamber F into the said mixing chamber. The gas and air during their passage through the mixing chamber D are intimately and thoroughly mixed by contact with the revolving blades I' of the revoluble wheel I, and the mixture finally passes through the outlet G³ into the engine to be used as motive agent therein.

In the lower end of central chamber K' of the head K is arranged a valve L controlled by a screw N screwing in the bottom of the reservoir A to permit of adjusting the valve L relatively to the opening K² to admit more or less liquid to the chamber K' from the chamber K³.

The air chamber F and the reservoir A are surrounded by a hot water jacket O having an inlet O' and an outlet O², the inlet being connected with a hot water or steam supply so that the heated circulating medium heats the liquid in the reservoir A and the air passing through the air chamber F so that a rapid evaporation of the liquid takes place and a hot mixture is formed prior to reaching the engine. The reservoir A is provided in the bottom with a draw-off cock P, and a plug Q is arranged in the bottom of the jacket O for drawing off the water therefrom whenever it is desired to do so.

The carbureter shown and described is very simple and durable in construction, and is arranged to insure a thorough and intimate mixture of the air and gas.

Having thus described my invention, I claim as new and desire to secure by Letters Patent:

1. A carbureter, comprising a reservoir for containing a liquid, a mixing chamber, an air chamber connected with the said mixing chamber at the inner end thereof, a revoluble mixing wheel in the said mixing chamber and having a hollow shaft extending into the said reservoir, the hollow shaft being provided with a spraying device discharging into the inner end of the said mixing chamber, an intake head within the said reservoir and held on the end of the said hollow shaft to rotate with the latter, and a manually-controlled means for regulating the inflow of the liquid to said hollow shaft at the said intake head.

2. A carbureter, comprising a reservoir for containing a liquid, a mixing chamber having an air inlet at one end and adapted to be connected at the other end with an engine, a revoluble wheel in the said mixing chamber and having a hollow shaft extending into the said reservoir, the said hollow shaft being provided with perforations in the said mixing chamber, and being provided with an annular sleeve having perforations staggered relative to the perforations in the said shaft, and an intake head within the said reservoir and secured to the said hollow shaft, the said suction head having a central chamber opening into the said hollow shaft, the wall of said central chamber being perforated, and the said head having a receiving chamber and provided with an inlet for the entrance of the liquid into the said receiving chamber.

3. A carbureter, comprising a reservoir for containing a liquid, a mixing chamber having an air inlet at one end and adapted to be connected at the other end with an engine, a revoluble wheel in the said mixing chamber and having a hollow shaft extending into the said reservoir, the said hollow shaft being provided with perforations in the said mixing chamber and being provided with an annular sleeve having perforations staggered relatively to the perforations in the said shaft, an intake head within the said reservoir and secured to the said hollow shaft, the said suction head having a central chamber opening into the said hollow shaft, the wall of the said central chamber being perforated and the said head having a receiving chamber surrounding the said central chamber and provided with an inlet for the entrance of the liquid into the said receiving chamber, a valve in the said central chamber controlling the perforations thereof, and an adjusting screw on the said reservoir and engaging the said valve.

4. A carbureter, comprising a casing having a transverse plate forming an upper mixing chamber and a lower reservoir, an air chamber communicating with the mixing chamber, a revoluble mixing wheel in the said mixing chamber, a revoluble hollow shaft on which said wheel is mounted, the lower end of said shaft extending into the said reservoir, and the upper end of said shaft communicating with the mixing chamber, and an intake head secured on, and surrounding the lower end of said shaft, and embodying means whereby to lift the liquid into the hollow of the shaft when the latter is rotated.

5. A carbureter, comprising a casing having a transverse plate forming an upper mixing chamber and a lower reservoir, an air chamber communicating with the mixing chamber, a revoluble mixing wheel in the said mixing chamber, a revoluble hollow shaft on which said wheel is mounted, the lower end of said shaft extending into the said reservoir, and the upper end of said shaft communicating with the mixing chamber, an intake head secured on, and surrounding the lower end of said shaft, and embodying an inner cylindrical wall forming an inner compartment communicating with said hollow shaft, an outer cylindrical wall spaced from the inner wall and forming an outer intake compartment therebetween, and means for forcing fluid into the inlet compartment and into the hollow shaft when the latter is rotated, said inner wall having an opening establishing communication between the compartments, a valve in the form of a plug which is movable within the inner wall to regulate communication with the outer compartment, and an adjusting screw threaded through the base of the casing and engaging said valve plug.

In testimony whereof I have signed my name to this specification in the presence of two subscribing witnesses.

ALFRED J. HIPPEL.

Witnesses:
 THEO. G. HOSTER,
 JOHN P. DAVIS.